(12) United States Patent
Douglas et al.

(10) Patent No.: US 7,735,367 B2
(45) Date of Patent: *Jun. 15, 2010

(54) VEHICLE WHEEL BALANCER SYSTEM WITH PROJECTION DISPLAY

(75) Inventors: Michael W. Douglas, St. Charles, MO (US); Nicholas J. Colarelli, Creve Coeur, MO (US)

(73) Assignee: Hunter Engineering Company, Bridgeton, MO (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/678,444

(22) Filed: Feb. 23, 2007

(65) Prior Publication Data

US 2007/0131026 A1 Jun. 14, 2007

Related U.S. Application Data

(63) Continuation-in-part of application No. 10/928,941, filed on Aug. 27, 2004, now Pat. No. 7,191,651.

(51) Int. Cl.
*G01M 1/08* (2006.01)
(52) U.S. Cl. .......................... 73/462; 353/13
(58) Field of Classification Search .................. 73/462, 73/146; 353/13, 69, 70
See application file for complete search history.

(56) References Cited

U.S. PATENT DOCUMENTS 4,480,471 A 11/1984 Kogler et al.
5,054,918 A 10/1991 Downing et al.
5,189,912 A 3/1993 Quinlan et al.
5,827,964 A 10/1998 Douine et al.
5,915,274 A 6/1999 Douglas
6,122,957 A 9/2000 Bux et al.
6,244,108 B1 6/2001 McInnes
6,484,574 B1 11/2002 Douglas et al.
6,535,281 B2 3/2003 Conheady et al.
2004/0050159 A1 3/2004 Corghi
2004/0051864 A1 3/2004 Braghiroli
2004/0083810 A1 5/2004 Racine
2005/0052657 A1 3/2005 Braghiroli
2005/0052658 A1 3/2005 Braghiroli
2005/0055153 A1 3/2005 Braghiroli

OTHER PUBLICATIONS

"Products"—Laser Projection Display (LPD) from Symbol Technologies—Mar. 19, 2004—4 pages.

*Primary Examiner*—John E Chapman
(74) *Attorney, Agent, or Firm*—Polster, Lieder, Woodruff & Lucchesi, L.C.

(57) ABSTRACT

A wheel balancer includes a microprocessor configured to receive data associated with a vehicle wheel rim and tire assembly imbalance from at least one sensor, and to identify optimal correction weight plane locations, as well as to present the operator with the imbalance correction weight arrangement. The microprocessor is further configured to control a projection display system disposed to project a two-dimensional image onto a surface of the vehicle wheel rim and tire assembly, to facilitate completion of a wheel imbalance correction procedure.

34 Claims, 9 Drawing Sheets

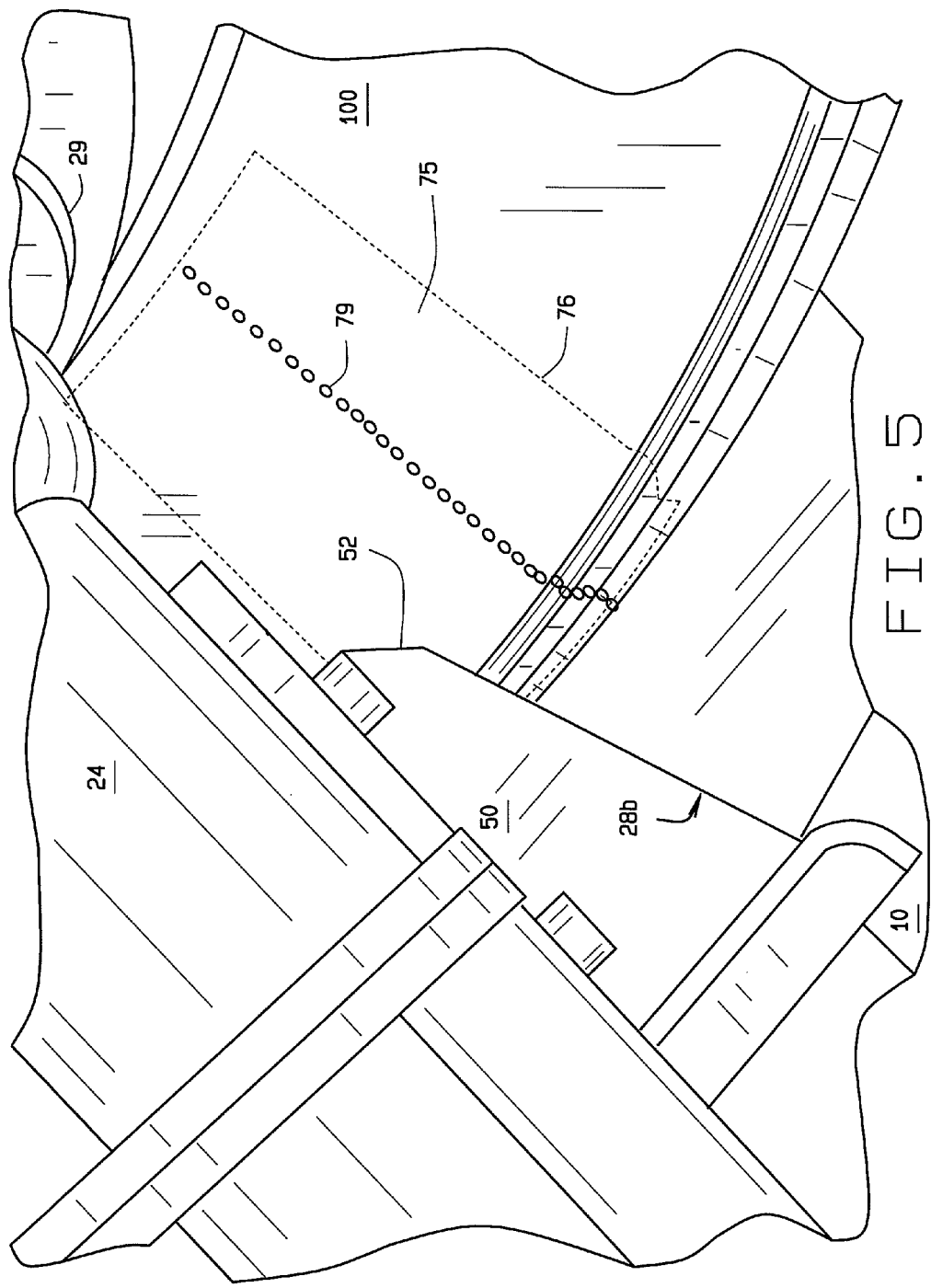

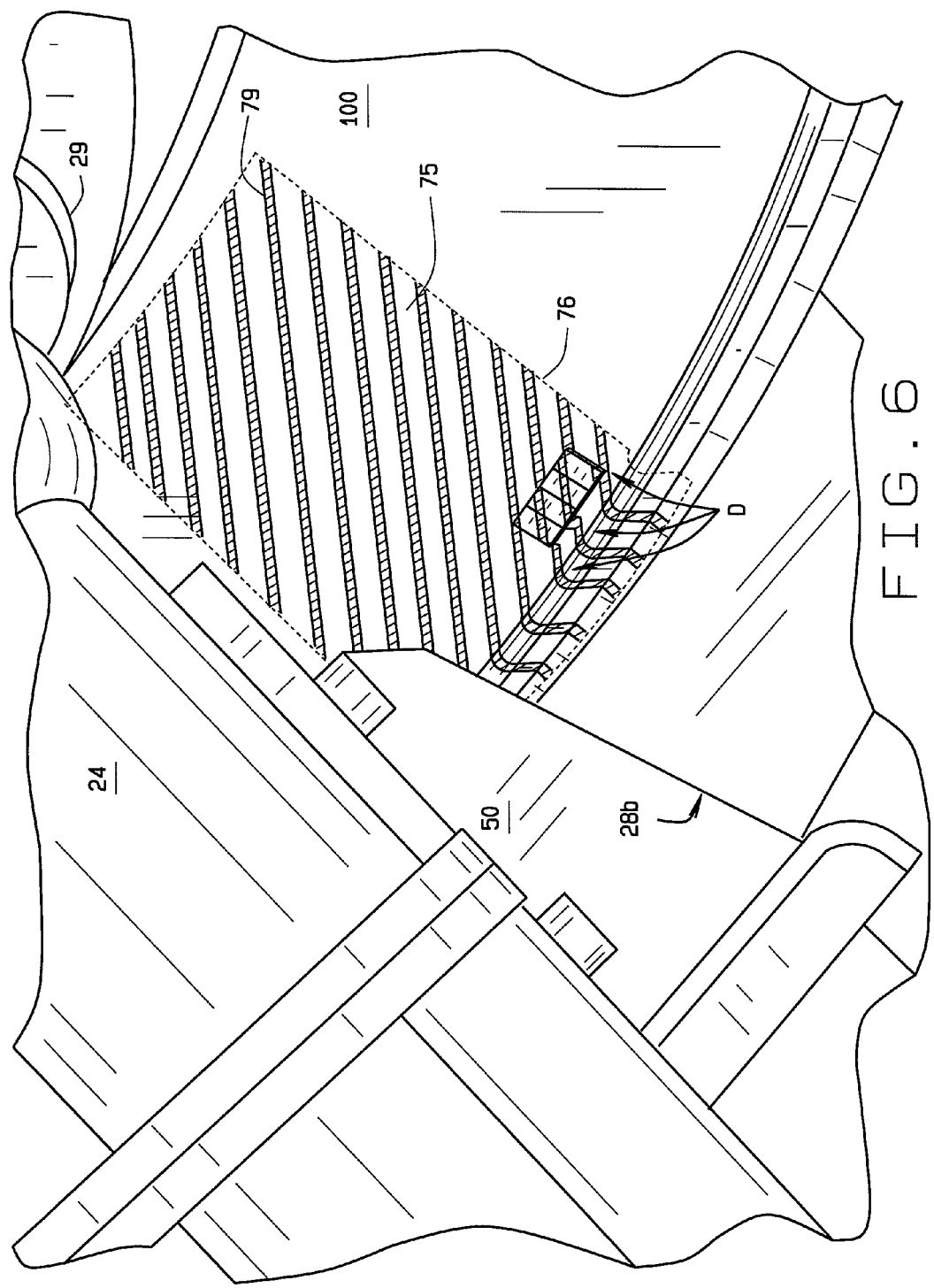

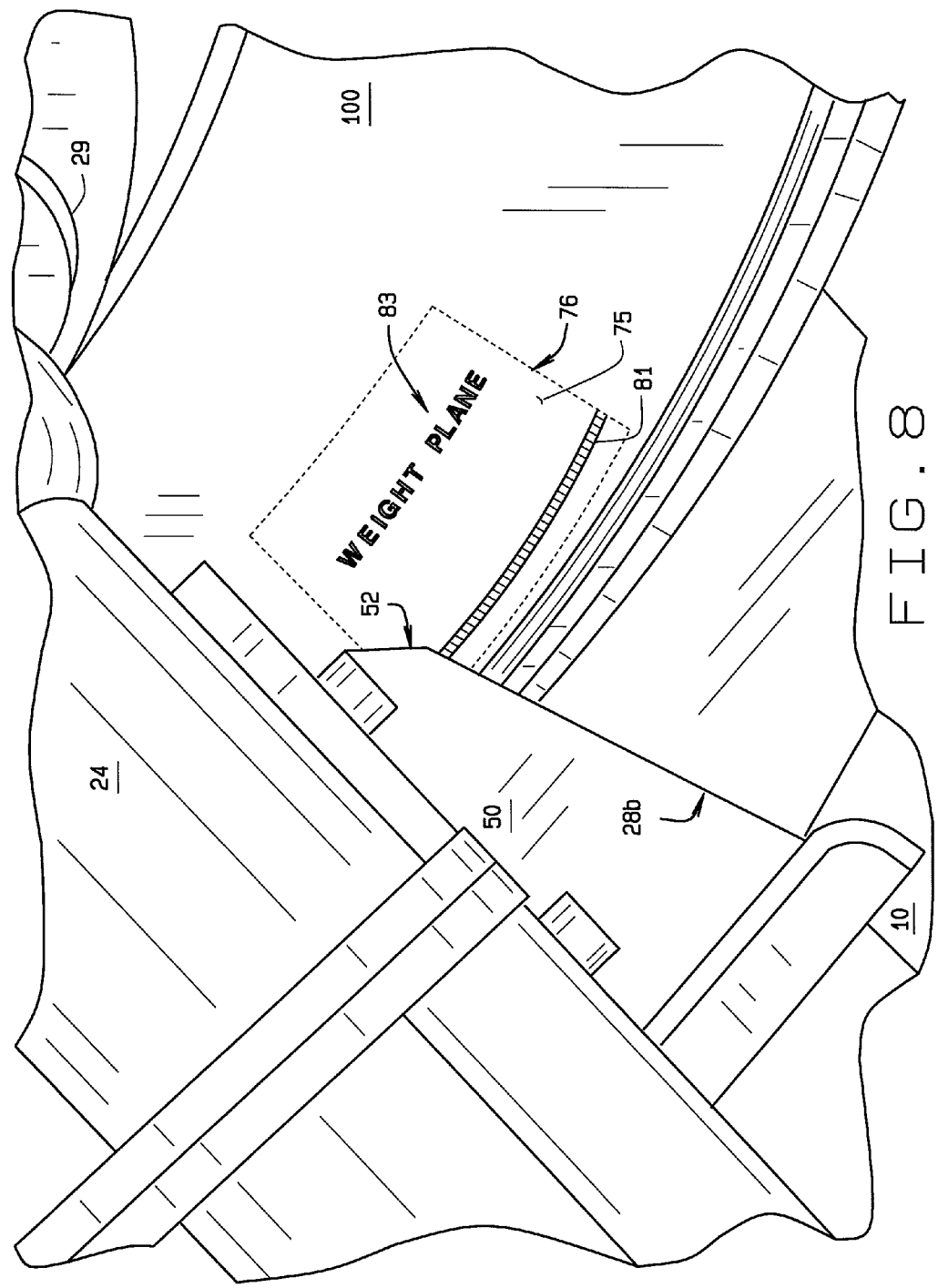

VEHICLE WHEEL BALANCER SYSTEM WITH PROJECTION DISPLAY

CROSS-REFERENCE TO RELATED APPLICATIONS

The present application is a continuation-in-part of co-pending U.S. patent application Ser. No. 10/928,941 filed on Aug. 27, 2004, from which priority is claimed and which is herein incorporated by reference.

STATEMENT REGARDING FEDERALLY SPONSORED RESEARCH

Not Applicable.

BACKGROUND OF THE INVENTION

The present invention relates to vehicle wheel balancer systems, and in particular, to a vehicle wheel balancer system configured to provide a projected display of information onto a surface of vehicle wheel rim to facilitate completion of a wheel imbalance measurement or correction procedure.

When balancing a vehicle wheel rim and tire assembly, which may consist of either a wheel rim by itself, or a wheel rim on which a tire has been mounted, several potential sources for operator error exist. First, there is a need to identify the proper correction planes on the wheel rim at which imbalance correction weights are to be placed. Second, the wheel rim and tire assembly must be correctly rotated to, and held in, a rotational position such that the operator can place an imbalance correction weight in the identified correction plane, and third, the operator must manually apply the imbalance correction weight to the wheel rim in the identified correction plane and at the proper rotational position.

The determination of unbalance in vehicle wheel rim and tire assemblies is carried out by an analysis of the phase and amplitude of the mechanical vibrations caused by the rotating unbalanced mass of the wheel rim and tire assembly. The mechanical vibrations are measured as motions, forces, or pressures by means of transducers, which convert the mechanical vibrations to electrical signals. The electrical signals are subsequently analyzed by a suitably programmed microprocessor. Each electrical signal is representative of a combination of fundamental oscillations caused by the rotating imbalance mass and noise.

It is well known in the art that a variety of types of imbalance correction weights are available for placing on a wheel rim to correct a measured imbalance. For example, adhesive-backed weights, patch balance weights, and hammer-on weights are available from a number of different manufacturers. Most wheel balancer systems are configured to assume that the wheel rim and tire assembly will be rotated to a particular rotational position (for example, disposing the desired weight correction position at the top—twelve o'clock—or bottom—six o'clock—rotational positions) during placement of an imbalance correction weight. This is generally not a problem, unless it would be more convenient to apply the weight with the wheel rim and tire assembly in a different rotational position, for example, the four or five o'clock rotational positions, when the operator is standing facing the surface of the wheel rim and tire assembly mounted on the wheel balancer system.

To compensate for a combination of static imbalance (where the heaviest part of the wheel rim and tire assembly will naturally tend towards a rotational position directly below the mounting shaft) and couple imbalance (where the rotating wheel rim and tire assembly exerts torsional vibrations on the mounting shaft), at least two correction weights are typically required to be separated axially along the wheel rim surface, coincident with weight location or imbalance correction "planes". For imbalance correction weights of the "clip-on" style, the "left plane" comprises the left (innermost) rim lip circumference while the "right plane" comprises the right rim lip. If imbalance correction weights of the "adhesive" style are used, the imbalance correction planes can reside anywhere between the rim lips, barring physical obstruction such as wheel spokes, valve stems, welds, or regions of excessive wheel rim curvature.

With the wheel rim and tire assembly mounted to the wheel balancer system, a scan of the wheel rim inner surface profiles is optionally acquired, either with a mechanical contact system, such as is described in U.S. Pat. No. 6,484,574 B1 to Douglas et. al. or a non-contact measurement system, such as is described in U.S. Pat. No. 6,535,281 B2 to Conheady, et al.

Next, the imbalance correction planes are selected and the relative distances from a reference plane (usually the surface of the wheel mounting hub) to each of the imbalance correction planes is either conventionally measured either by manual measurement with a pull-out gauge or caliper, and manual input of the observed values through a keypad, potentiometer, or digital encoder, or by using an automatic electronic measuring apparatus which provides a direct measurement of the relative distance to the wheel balancer microprocessor. The radius of the wheel rim at which the weights will be placed must also be entered, again either manually, or by use of the electronic measuring apparatus.

Conventional wheel balancers can also employ a microprocessor configured to utilize the input weight plane information, together with variable weight amounts and variable radial placements, to identify proper locations for placement of the imbalance correction weights on the wheel rim, and to control rotation of the wheel rim and tire assembly. While utilization of such a balancer system facilitates the placement of an imbalance correction weight by placing the vehicle wheel rim and tire assembly in a preferred, or optimal rotational position for placement of the imbalance correction weight, it does not reduce other sources of operator error, such as the physical placement of an imbalance weight on the wheel, a poor selection of imbalance planes by the operator, or failure to compensate for the width of the imbalance weights during installation.

Automatic positioning of the wheel rim and tire assembly to a predetermined imbalance correction weight placement rotational position can be enhanced with the addition of a visual guide to the operator. U.S. Pat. No. 6,484,574 B1 to Douglas et al. combines a continuous laser projection guide with wheel balancer system including a direct current motor. The wheel balancer includes a shaft adapted for receiving a wheel rim and tire assembly, having a longitudinal axis and which is rotatable about the axis by a controllable motor, so as to rotate a wheel rim and tire assembly removably mounted thereon. A rotation sensor assembly is provided for measuring rotation of the shaft about its longitudinal axis and a vibration sensor assembly is operatively connected to the shaft for measuring vibrations resulting from imbalance in the wheel rim and tire assembly. A control circuit controls the application of power to the motor and determines from vibrations measured by the vibration sensor assembly, at least one weight placement position on the wheel rim and tire assembly to correct the vibrations. The control circuit is responsive to determination of an imbalance correction weight plane to project a laser projection onto the surface of the wheel rim at the selected imbalance correction plane. The controller then rotates the wheel rim and tire assembly to bring the weight placement position to a predetermined rotational location coinciding with the laser projection in the imbalance correction weight plane, and to actively hold the wheel rim and tire assembly in that rotational location at which an imbalance correction weight is to be placed.

During a wheel balancing procedure, an operator must divide attention between information and instructions displayed on the console of the wheel balancer system and the laser projection on the surface of the wheel rim for imbalance correction weight placement. Accordingly, it would be advantageous to provide a vehicle wheel rim and tire balancer system with the ability to project a two-dimensional display of visual information onto the surface of a vehicle wheel rim to assist an operator in completing a vehicle wheel rim and tire balancing procedure.

It would be further advantageous to utilize a projected two-dimensional display on the surface of a vehicle wheel rim and tire assembly to facilitate non-contact measurements of a vehicle wheel rim and tire assembly surface profile through the projection and observation of a series of points, lines, or patterns on the surface of the vehicle wheel rim and tire assembly.

BRIEF SUMMARY OF THE INVENTION

Briefly stated, a wheel balancer of the present invention includes a microprocessor configured to receive data associated with a vehicle wheel rim and tire assembly from at least one sensor, and to identify optimal correction weight plane locations, as well as to present the operator with the imbalance correction weight arrangement. The microprocessor is further configured to control a projection display system disposed to project a two-dimensional bit-mapped image of information onto a surface of the vehicle wheel rim, to facilitate completion of an wheel imbalance correction procedure.

A method of the present invention to facilitate completion of a wheel imbalance correction procedure requires the steps of mounting a wheel rim and tire assembly onto a balancer. Once mounted, an imbalance measurement of the wheel rim and tire assembly is obtained, and imbalance correction weight placement planes and imbalance correction weight placement rotational positions are identified. A two-dimensional bit-mapped image of information selected to facilitate installation of an imbalance correction weight is projected onto a surface of the wheel rim and tire assembly.

An alternate method of the present invention to facilitate completion of a wheel imbalance correction procedure includes the steps of mounting a wheel rim and tire assembly onto a balancer. Once mounted, a two-dimensional bit-mapped image of a graphical user interface or visual display of information is projected onto a surface of the wheel rim and tire assembly, providing operator with an interactive display of visual elements representing vehicle and wheel data, menus, actions or textual information and instructions for completing the imbalance correction procedure. An imbalance measurement of the wheel rim and tire assembly is obtained, and with the imbalance measurement, associated imbalance correction weight placement planes, and imbalance correction weight placement rotational positions are identified and are presented to the operator on the projected display.

An alternate method of the present invention to facilitate completion of a wheel imbalance correction procedure includes the initial step of mounting a wheel rim and tire assembly onto a balancer. A two-dimensional image is projected onto a surface of the wheel rim and tire assembly, and one or more images of the two-dimensional image are acquired. At least one parameter of the wheel rim and tire assembly is determined from the acquired images.

An alternate method of the present invention to facilitate completion of a wheel imbalance correction procedure includes the initial step of mounting a wheel rim and tire assembly onto a balancer. A two-dimensional image having a predetermined configuration is projected onto a surface of the wheel rim and tire assembly, and one or more images of the two-dimensional image, distorted from the predetermined configuration by a profile of the surface of the wheel rim and tire assembly are acquired. The distortions from the predetermined configuration in the acquired images are measured, and a representation of the profile of the of the wheel rim and tire assembly is determined there from.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is a perspective view of a sequence of illuminated pixels projected onto a surface of a wheel rim and tire assembly along a common line;

FIG. 6 is a perspective view of a two-dimensional pattern projected onto a surface of a wheel rim and tire assembly;

FIG. 8 is a perspective view of a two-dimensional image including text projected on a surface of a wheel rim and tire assembly to illustrate a weight placement plane;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
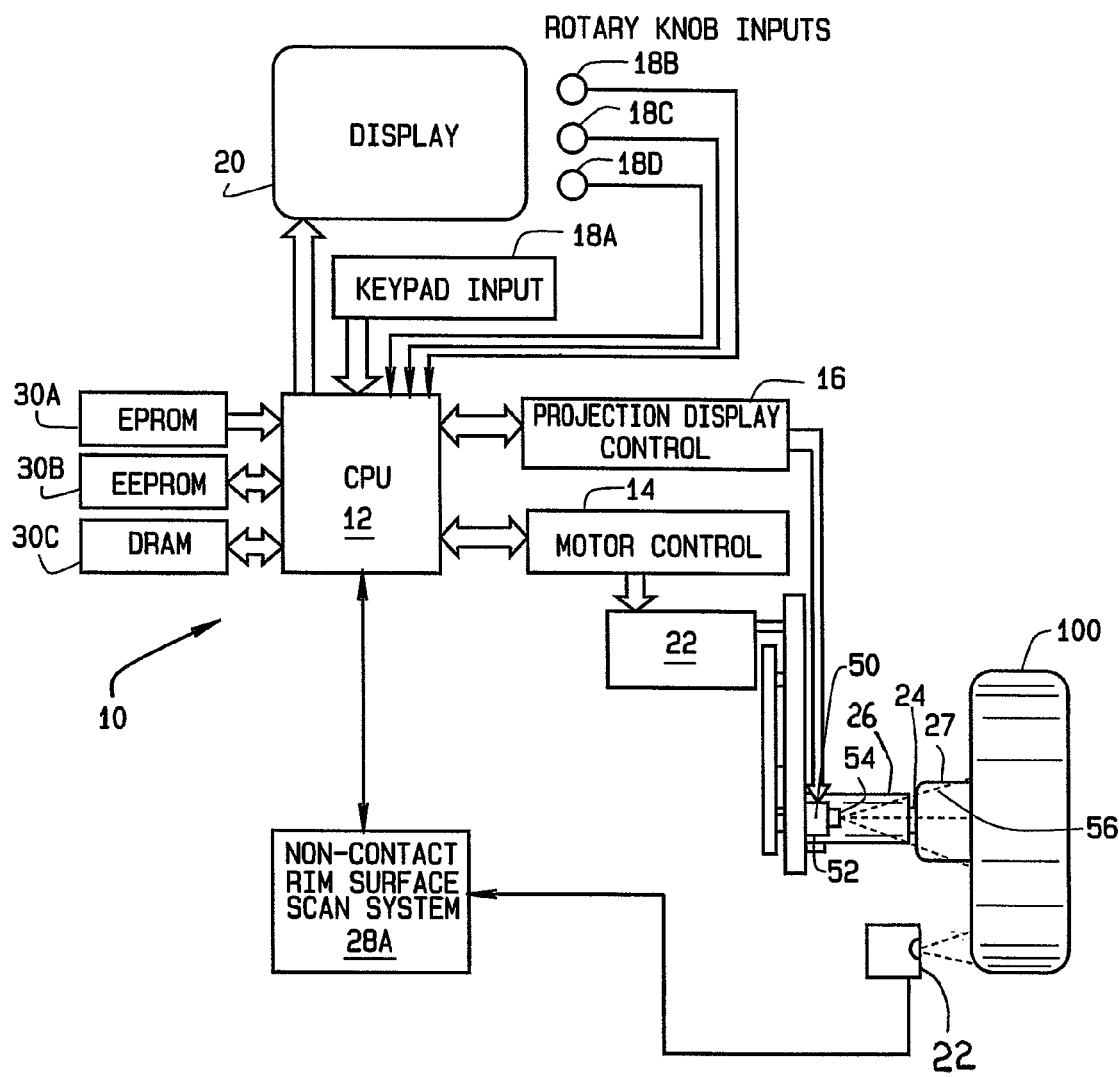
FIG. 1 is a combination diagrammatic plan view, block function diagram of a wheel balancer of the present invention system.

Turning to FIG. 1, the components of a vehicle wheel balancer 10 of the present invention are generally shown. The vehicle wheel balancer 10 includes a microprocessor 12 having sufficient processing capability for a vehicle wheel balancer application, which is operatively coupled to a motor controller 14, a projection display controller 16, one or more operator input devices 18A-18D, and a display device 20.

A motor 22, controlled by the motor controller 14 drives a rotating spindle 24, upon which a vehicle wheel rim and tire assembly 100 is removably mounted for measuring imbalance. The rotating spindle 24 is supported by a support structure 26, to which conventional rotational position sensors and force transducers are operatively coupled to measure forces representative of an imbalance present in a rotating vehicle wheel rim and tire assembly 100 mounted to a hub 27 on the spindle 24. These rotational position sensors and force transducers, together with corresponding interface circuitry to the microprocessor 12, are well known in the balancer art, and thus are not shown. The microprocessor 12 is further coupled to a rim measuring component 28, and to one or more electronic memory devices, such as an EPROM 30A, EEPROM 30B, or RAM 30C.

The projection display control 16 is configured to control the operation of a projection display system, preferably a digital laser projection display (LPD) system 50, but which may alternatively consist of a rear projection LCD system, digital light projection display, or any other projection display system which is capable of controllably projecting a two-dimensional image onto a surface within a stationary field of projection. The orientation of the stationary field of projection may be adjustable, either manually or automatically, such as by means of an actuator, pivot, lever, cam or other suitable orientation adjustment mechanism to facilitate the selection of an alignment of the field of projection. Preferably, the orientation of the field of projection remains stationary during image projection, and the orientation adjustment mechanism enables the orientation of the field of projection to be altered for the projection of images onto different surfaces at different times as may be required by the particular procedure in use. In one embodiment, a laser projection system 50 is housed in a self-contained projector housing 52, and includes at least one conventional laser emitter 54 positioned to project a beam of laser light 56, which is optionally visible to a detector, within a field of projection oriented towards a surface of the wheel rim and tire assembly 100 mounted on the spindle 24.

Figure 2:
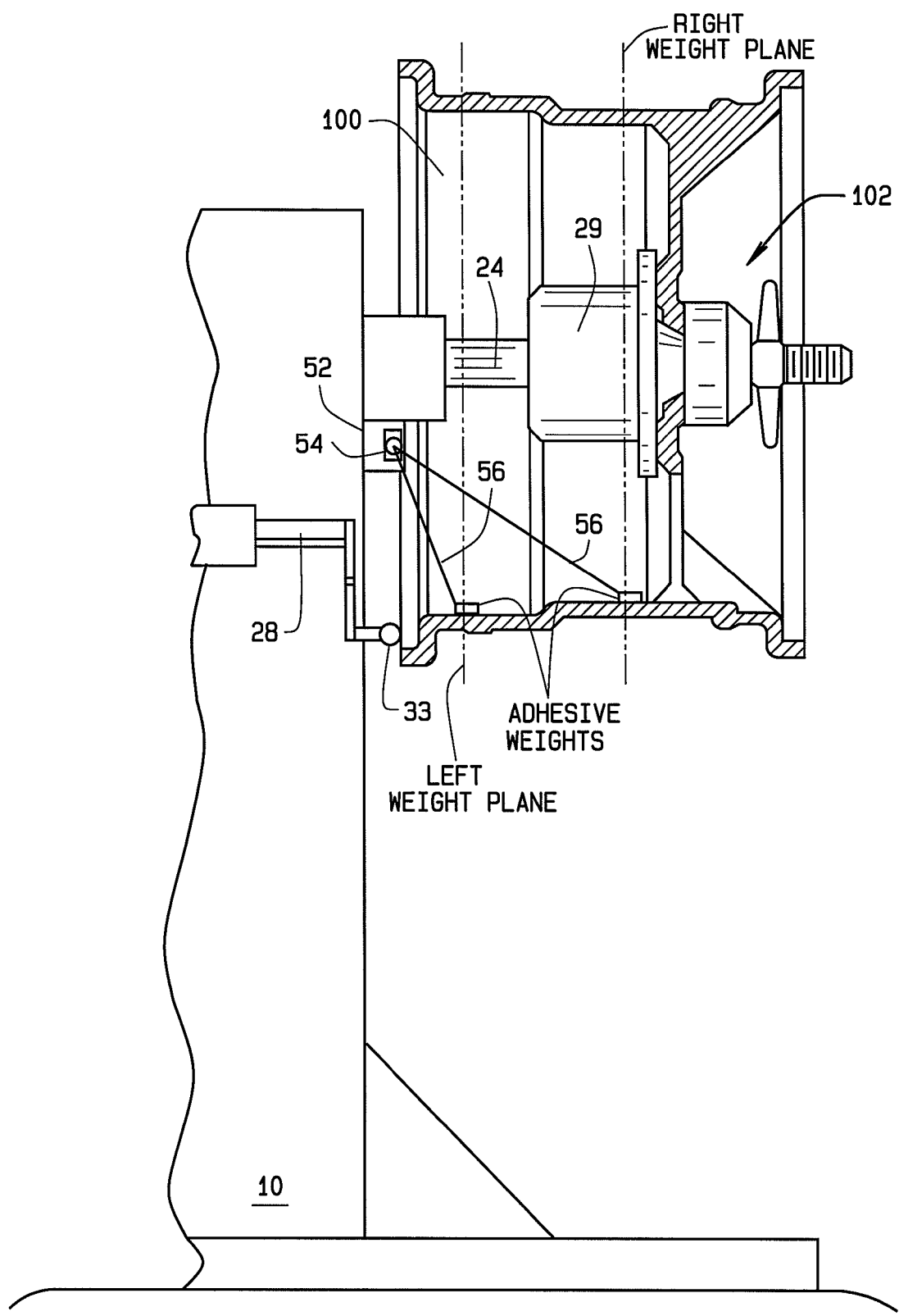
FIG. 2 is a combination cross section, diagrammatic illustration showing how the projection display of the present invention projects a bit-mapped image onto a surface of the vehicle wheel rim.

As best seen in FIG. 2, the laser emitter 54 is mounted within the housing 52 such that a projected laser beam 56 with the stationary field of projection intersects at least the inner surface of the wheel rim and tire assembly 100, generating at least one visible point of light. Included within the housing 52 is an illumination deflection system, preferably consisting of two or more micro-mirrors. A first micro-mirror is configured to deflect the laser beam 56 in a controlled fashion along a first axis in a plane, while the second micro-mirror is configured to deflect the laser beam 56 along a second axis, perpendicular to the first axis. The limits of deflection define the boundaries of the stationary field of projection for the display system within which the projected image is displayed. Those of ordinary skill in the art will recognize that the particular illumination deflection system utilized is not critical to the invention, provided that the resulting image projected within the stationary field of projection is of sufficient size and quality for use, and that different types of illumination deflection systems may be utilized, based on physical requirements of the display system 50, without departing from the scope of the invention. For example, a single micro-machined mirror capable of two-axis tilt may be utilized to deflect a laser beam to form individual pixels in an image, or a plurality of tilting micro-machined mirrors may be utilized, one for each pixel in a projected image. Similarly, the projected images may be generated without the use of moving mirrors by projecting laser means through a controlled holographic diffraction pattern on an LCD screen between the laser source and the surface on which the image is to be projected.

Through selective laser activation and control of the micro-mirrors, the laser beam 56 is controlled to project points of light, or illuminated pixels, at discrete locations within a two-dimensional area on the surface of the vehicle wheel rim and tire assembly 100 within the field of projection. These points of light, or illuminated pixels are disposed within the boundaries of the stationary field of projection of the projection display system, and collectively define a bit-mapped image projected onto the surface of the wheel rim and tire assembly 100. The bit-mapped image may include displays of icons, menus, alphanumerical data, graphical data, or other visual displays configured to assist an operator in carrying out an operation of the vehicle wheel balancer 10. By providing the ability to project an image within a stationary field of projection, the present invention enable images to be projected over a large portion of a wheel rim surface without the need for mechanical movement of the projection system itself during image projection, enabling the projection system to be maintained in a fixed position relative to the placement location for the vehicle wheel rim and tire assembly. Those of ordinary skill will recognize that the projection system may be moved to a different orientation or position to enable projection of an image onto different surfaces.

Throughout the present description, the term "bit-mapped image" will be understood to refer to a projected image 75 composed of an arrangement of discrete points or pixels, some of which may be illuminated, and some of which may be dark. A "bit-mapped image" as used herein is not intended as a reference to a manner or format in which data is stored in an electronic memory. Those of ordinary skill in the art will recognize that although an image is composed of discrete points or pixels, as projected onto a surface, it may appear to a human observer as if the discrete points or pixels are continuous, due to an inability of the human observer to visually distinguish spaces or gaps separating each discrete point or pixel.

Activation of the laser emitter 54, as well as positional control of the point of intersection of the laser beam 56 with the vehicle wheel rim and tire assembly 100 is selectively controlled by the projection display control 16. Selective activation of the laser emitter 54 combined with controlled deflection of the laser beam 56 within the field of projection enables the projection display control 16 to project a bit-mapped image 75 onto a surface of the vehicle wheel rim and tire assembly 100 using the laser emitter 54. Individual pixels comprising the bit-mapped image 75 within the field of projection 76 are defined by discrete points of visible light projected by the laser beam 56 as well as discrete "spaces" intentionally left un-illuminated or dark by the laser beam 56.

Controlled variation in an activation period of the laser emitter 54 for each illuminated pixel location provides two or more levels of grey-scale equivalent resolution for each illuminated pixel location. Preferably, the laser projection display system 50 is capable of projecting a bit-mapped image

75 in a field of projection 76 having a resolution of at least 640 pixels by 480 pixels, and a grey-scale equivalent resolution of at least 16 levels, corresponding to a VGA standard display. A suitable laser projection display system 50 is manufactured by Motorola. of Holtsville, N.Y., and sold under the name Symbol Laser Projection Display.

In an alternative embodiment, the laser projection display system 50 is configured with multiple laser emitters 54, each projecting within the field of projection, a laser beam 56 of a different color in the visible light spectrum, for example, a red laser beam, a green laser beam, and a blue laser beam, thereby enabling the laser projection display system 50 to project a multi-color two-dimensional bit-mapped image 75 onto the surface of a vehicle wheel rim and tire assembly 100.

Multiple colors may be utilized to facilitate imbalance correction procedures by providing the operator with simple visual representations of imbalance levels, for example, providing a green icon to indicate to an operator that the wheel rim and tire assembly 100 measured imbalance meets a predetermined tolerance level, or a red border or region to indicate to an operator one or more detected features on the wheel rim and tire assembly 100 surface which may interfere with the placement of an imbalance correction weight. Images of bar graphs presented to the operator on the surface of the wheel rim and tire assembly 100 may be provided with colored regions representative of different degrees of tolerance, and/or may change colors corresponding to adjustments made by an operator.

Figure 3:
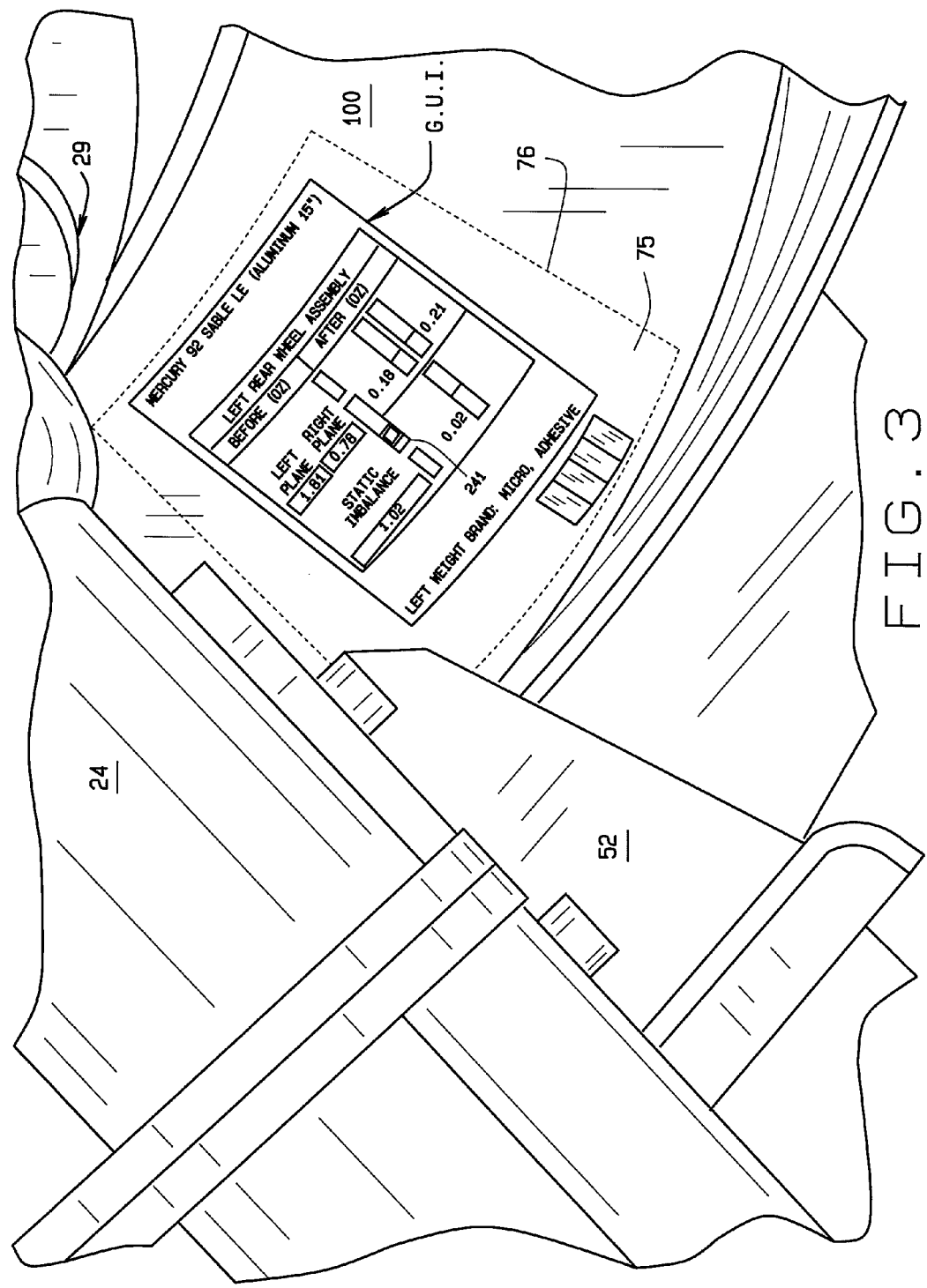
FIG. 3 is a perspective view of a graphical user interface projected onto a surface of a wheel rim and tire assembly.

Similarly, a display of a graphical user interface (GUI) may be projected onto a surface of the wheel rim and tire assembly 100, such as shown in FIG. 3. During a vehicle wheel balancing procedure, an operator is required to direct attention to the various surfaces of the wheel rim and tire assembly 100, such as during the placement of imbalance correction weights or the measurement of wheel rim dimensions. The projected display of a graphical user interface (GUI) onto a surface of the wheel rim and tire assembly 100 enables the operator to carry out various wheel balancing procedures without having to look away from the wheel rim and tire assembly 100. The GUI display may be presented to the operator in a multi-color configuration, appearing similar or identical to a display of the GUI presented to the operator on an associated conventional display 20 such as a CRT or LCD Alternatively, the projected GUI display may be varied from that which is presented on the conventional display 20, providing the operator with a display or information, icons, or menus which are relevant only to a particular task at hand.

As is commonly understood by those of ordinary skill, a graphical user interface (GUI) is a display of information to the operator which includes interactive elements which are representative of various actions and objects. For example, these actions and objects may be associated with the vehicle wheel balancer 10 and the wheel rim and tire assembly 100, and may include graphical displays of imbalance forces, imbalance correction weight placement locations, and associated tolerances in a windowed format. The displayed graphical user interface may include a "selectable" interactive element which the user may "select" via a pointer controlled by a conventional input device such as mouse or track ball. Those of ordinary skill in the art will readily recognize that the display need not include any selectable elements if it is merely presenting data to the operator, or may include multiple selectable elements. Upon "selection" of an interactive element shown in the display of the graphical user interface, an associated action is carried out by the vehicle wheel balancer 10. For example, the graphical user interface may be configured to display instructions for the placement of an imbalance correction weight onto the wheel rim and tire assembly 100. Upon placement of the imbalance correction weight, the operator may "select" or "click" on an icon displayed in the graphical user interface to receive instructions for the next step in the procedure, or to indicate completion of the procedure, thereby interacting with the vehicle wheel balancer 10 through the graphical user interface (GUI).

Control of the laser projection display system 50 by the microprocessor 12 to alter a projected image 75 is optionally responsive to one or more events during the operation of the vehicle wheel balancer 10. For example, the microprocessor 12 may be responsive to operator input to direct the later projection display system 50 to alter the projected image 75, i.e., upon the operator selecting an imbalance correction weight placement plane or altering an imbalance correction weight placement rotational position. Alternatively, the projected image 75 may be altered responsive to a parameter of a measured imbalance of a wheel rim and tire assembly 100, or the current rotational position of the wheel rim and tire assembly 100.

Operation of the vehicle wheel balancer 10 of the present invention is next described with reference to FIG. 4. The first step in balancing the wheel rim and tire assembly 100, i.e., mounting the wheel rim and tire assembly onto the spindle 24, is conventional and well known to those of ordinary skill in the wheel balancer field, and is not described herein in detail.

Figure 4:
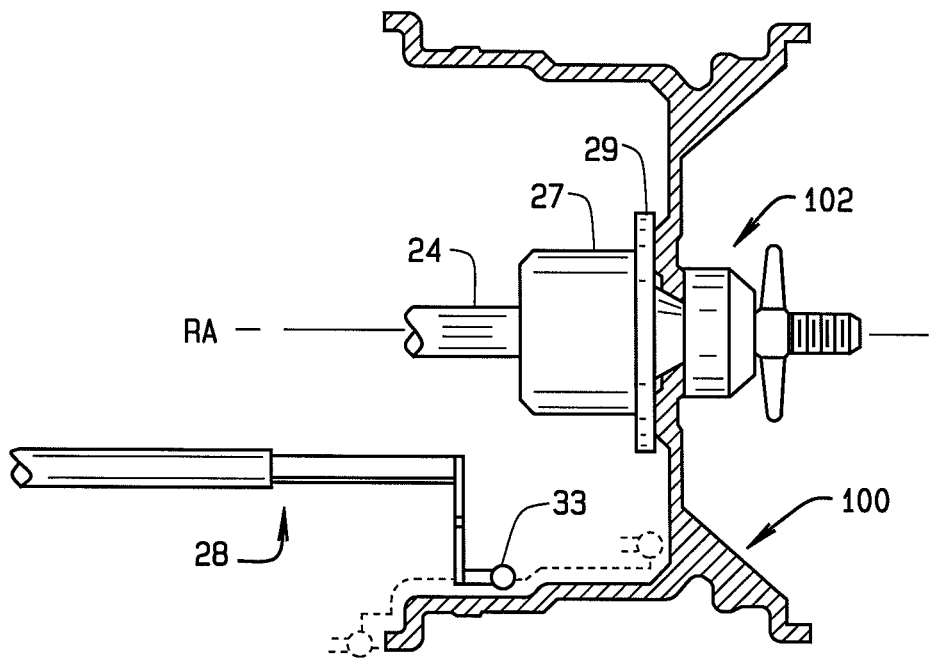
FIG. 4 is a combination cross section, diagrammatic illustration showing a typical wheel rim mounted on a wheel balancer with a conventional rim measuring apparatus.

Typically, the second step requires inputting the wheel rim and tire assembly 100 profile utilizing a conventional mechanical rim measuring component 28 is described in general with reference to FIG. 4. A typical wheel rim is shown mounted with conventional mounting hardware 102, clamped against the face plate 29 of the mounting hub 27. The rim measuring apparatus 28 is mounted as close to the spindle 24 centerline RA as possible while still allowing the apparatus 28 to clear the mounting hub face plate 29. To scan the wheel profile the operator first extends and positions a pointer ball 33 to the farthest distance as physically possible. The microprocessor 12 recognizes the extension of the pointer ball 33 as a desire to initiate a scan, transmits a confirmation signal, and waits for the apparatus 28 to be held steady. After the apparatus 28 is held steady for approximately one second, a configuration is signaled to the operator to begin the scan. The pointer ball 33 is dragged along the wheel rim surface, following the contour. The microprocessor 12 acquires periodic sets of signals corresponding to wheel rim diameters and distances from sensors associated with the apparatus 28. The pointer ball 33 is dragged all the way to the point where the pointer ball 33 contacts the tire or rim edge, at which point the ball 33 is again held steady and the microprocessor 12 responds with a confirmation signal that the scan is finished, storing sets of distances and diameters, and the apparatus 28 can be returned to the storage position.

A conventional right plane measuring apparatus (not shown) capable of reaching the right side of the wheel rim may optionally be provided with the present invention. The surfaces suitable for adhesive weights and the right rim location may be scanned in the same manner as the left side of the wheel rim 100, to provide a complete wheel rim profile.

In an alternate embodiment, the conventional mechanical rim measuring apparatus 28 may be replaced by a non-contact rim measuring apparatus 28A including at least one sensor 28B configured to acquire light reflected from a surface of the vehicle wheel rim and tire assembly 100, from which the microprocessor 12 can calculate a wheel rim profile. The sensor 28B may be incorporated into the same housing or assembly as the projection display system 50.

For example, as shown in FIG. 5, the projection display system 50 may be controlled to project a sequence of illuminated pixels 77 on a common line onto a surface of the wheel rim and tire assembly 100. The illuminated pixels 77 are observed by the sensor 28B. Using triangulation or any other conventional range-finding techniques, a distance from the sensor 28B to each illuminated pixel may be determined, and from the set of determined distances, a representation of the wheel rim and tire assembly profile along the common line is generated. Those of ordinary skill in the art will recognize that the illuminated pixels 77 may be illuminated one at a time, in a series of projected images 75, or may be illuminated simultaneously in a single projected image 75.

In an alternative embodiment, shown in FIG. 6, the projection display system 50 is configured to projected a two-dimensional image 75 having predetermined characteristics onto the surface of the wheel rim and tire assembly 100. The predetermined characteristics may include, for example, a collection of discrete points 77, a series of lines 79, or regular geometric patterns. An image of the projected image is acquired by the sensor 28B, and evaluated by the microprocessor 12 to identify distortions D in the acquired image of the predetermined characteristics. These distortions D of the predetermined characteristics are imparted on the projected image by surface features of the wheel rim and tire assembly 100. Using conventional image processing and manipulation algorithms, a mathematical representation of the surface onto which the predetermined characters were projected is calculated from the identified distortions D, thereby obtaining a representation of the wheel rim and tire assembly profile for the region onto which the two-dimensional image is projected.

Figure 7:
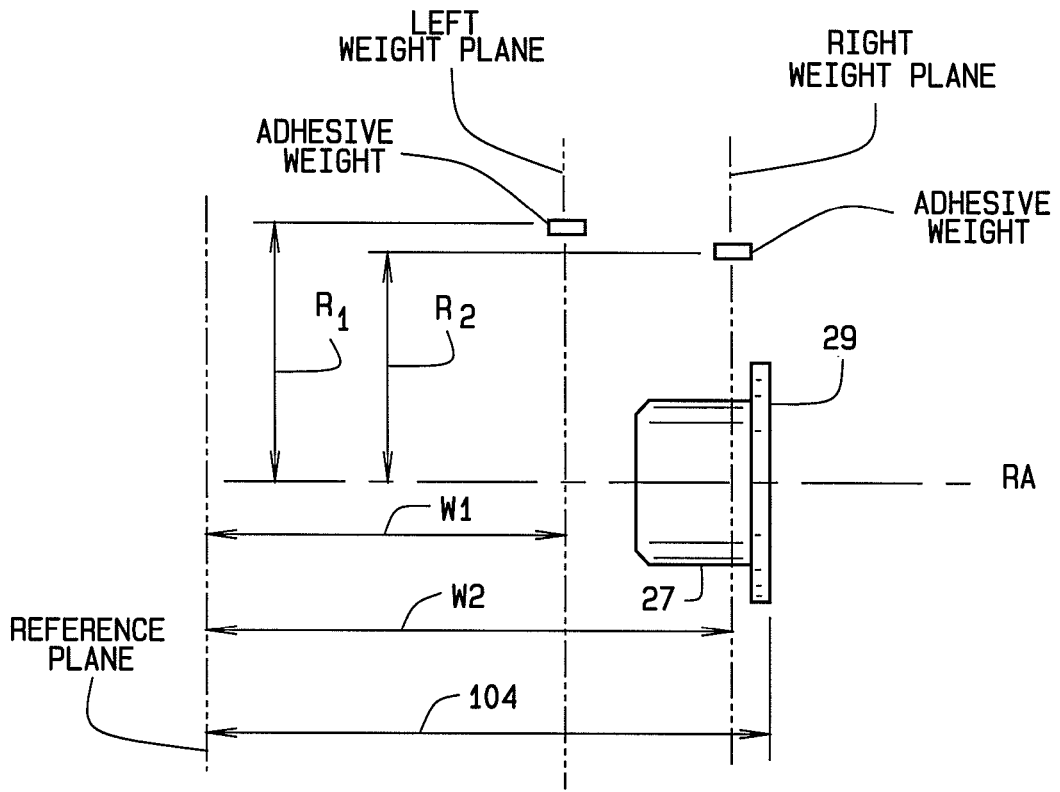
FIG. 7 illustrates the geometric relationships between imbalance correction weight locations residing on weight correction planes.

FIG. 7 shows an exemplary weight plane arrangement that could be obtained from a distance and diameter data set acquired during a wheel scanning step. The plane locations are simply distances from a fixed reference plane known to the wheel balancer system 10. Typically, the reference plane is an imaginary fixed offset 104 from the face 29 of the mounting hub 27, which yields a positive values along any measurable point reachable by the measuring apparatus 28. With a particular measured static and couple imbalance obtained from a measurement spin of the wheel rim and tire assembly 100, and with a particular set weight plane locations W1, W2 and corresponding radii R1, R2, the balancer microprocessor 12 determines the required imbalance correction weight amount and radial placement angle for an imbalance correction weight in each weight plane W1, W2 using conventional algorithms well known to those of ordinary skill in the wheel balancer field. A full explanation of the algorithms employed during this weight calculation may be found in U.S. Pat. No. 5,396,436 to Parker et al., herein incorporated by reference. As shown in FIG. 8, once determined, one or both of the weight plane W1 or W2 may be illuminated on the surface of the wheel rim and tire assembly 100 by a projected line 81 and associated identifying indicia 83 in a projected image 75. Preferably, the field of projection associated with the projection display has sufficient width to span the majority of a wheel rim axial width, enabling the projection display to project images onto two or more weight planes (W1, W2) either simultaneously or separately, without requiring any mechanical movement or adjustment to the field of projection.

In an alternative embodiment, the projection display system 50 is configured to project a two-dimensional image having predetermined characteristics, such as previously described in connection with FIG. 6, onto the surface of the wheel rim and tire assembly 100 as the wheel rim and tire assembly 100 is rotated through one or more complete revolutions about the axis of the spindle 24. The projected image is observed by the sensor 28B during the rotation, either continuously, or in a series of discrete acquired images, from which changes in the predetermined characteristics during the rotation of the wheel rim and tire assembly 100 can be identified. Preferably, these changes are indexed to the rotational position of the wheel rim and tire assembly 100. From the observed changes and the associated rotational positions of the wheel rim and tire assembly 100, the microprocessor 12 is configured to generate a representation of runout of the surface of the wheel rim and tire assembly 100 onto which the projection display system 50 is projecting the two-dimensional image.

At any point during a vehicle wheel imbalance measurement procedure at which information is required to be displayed to an operator, the microprocessor 12 is configured to optionally direct the projection display control 16 to project a two-dimensional bit-mapped image 75 onto a surface of the wheel rim 100 using the laser projection display system 50. Since the laser projection display system 50 is preferably capable of projecting a two-dimensional bit-mapped image 75 having a field of projection 76 with a resolution of at least 640 pixels by 480 pixels, and an equivalent grey-scale resolution of at least 16 levels, corresponding to a VGA standard display, information optionally presented to an operator on a conventional CRT or LCD display device 20, such as text, graphics, or a display of components of a graphical user interface (GUI) may be projected onto a surface of the vehicle wheel rim and tire assembly 100.

Those of ordinary skill in the art will recognize that during a vehicle wheel imbalance correction procedure, a large amount of the information presented to an operator is directly associated with a vehicle wheel rim and tire assembly 100, often requiring the operator to obtain the information from the conventional display 20 disposed apart from the vehicle wheel rim and tire assembly 100, and to then perform an action associated with the vehicle wheel rim and tire assembly 100, while looking away from the conventional display 20. Utilizing the laser projection display system 50 of the present invention, the microprocessor 12 is configured to present the operator with the information in the form of a two-dimensional bit-mapped image 75 directly on a surface of the wheel rim and tire assembly 100, eliminating the need for the operator to switch a focus of attention between a conventional display 20 and the wheel rim and tire assembly 100.

Figure 9:
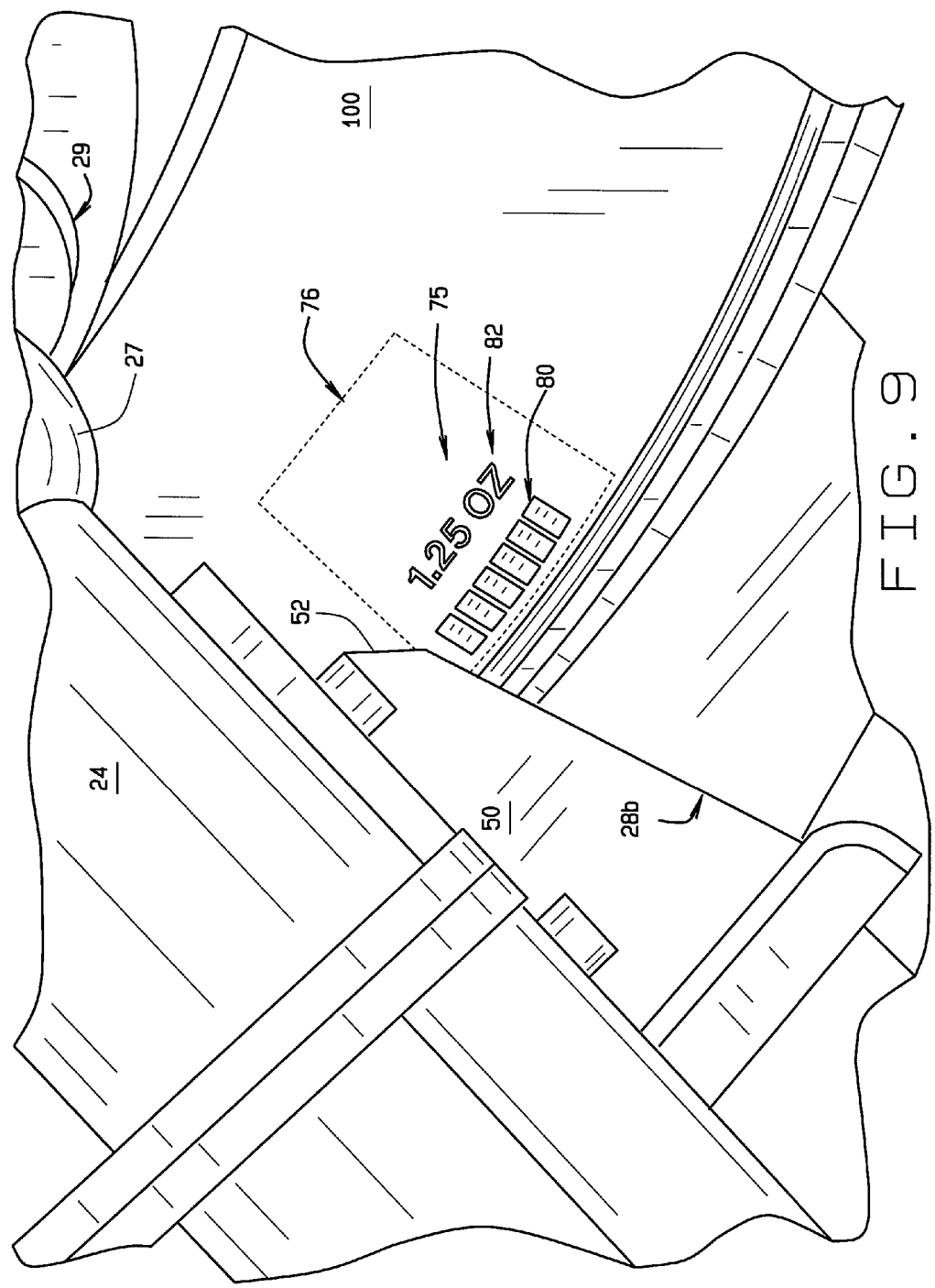
FIG. 9 is a perspective view of a two-dimensional image of an imbalance correction weight and associated alphanumerical data projected onto a surface of a wheel rim and tire assembly at an imbalance correction weight placement location.
Figure 10:
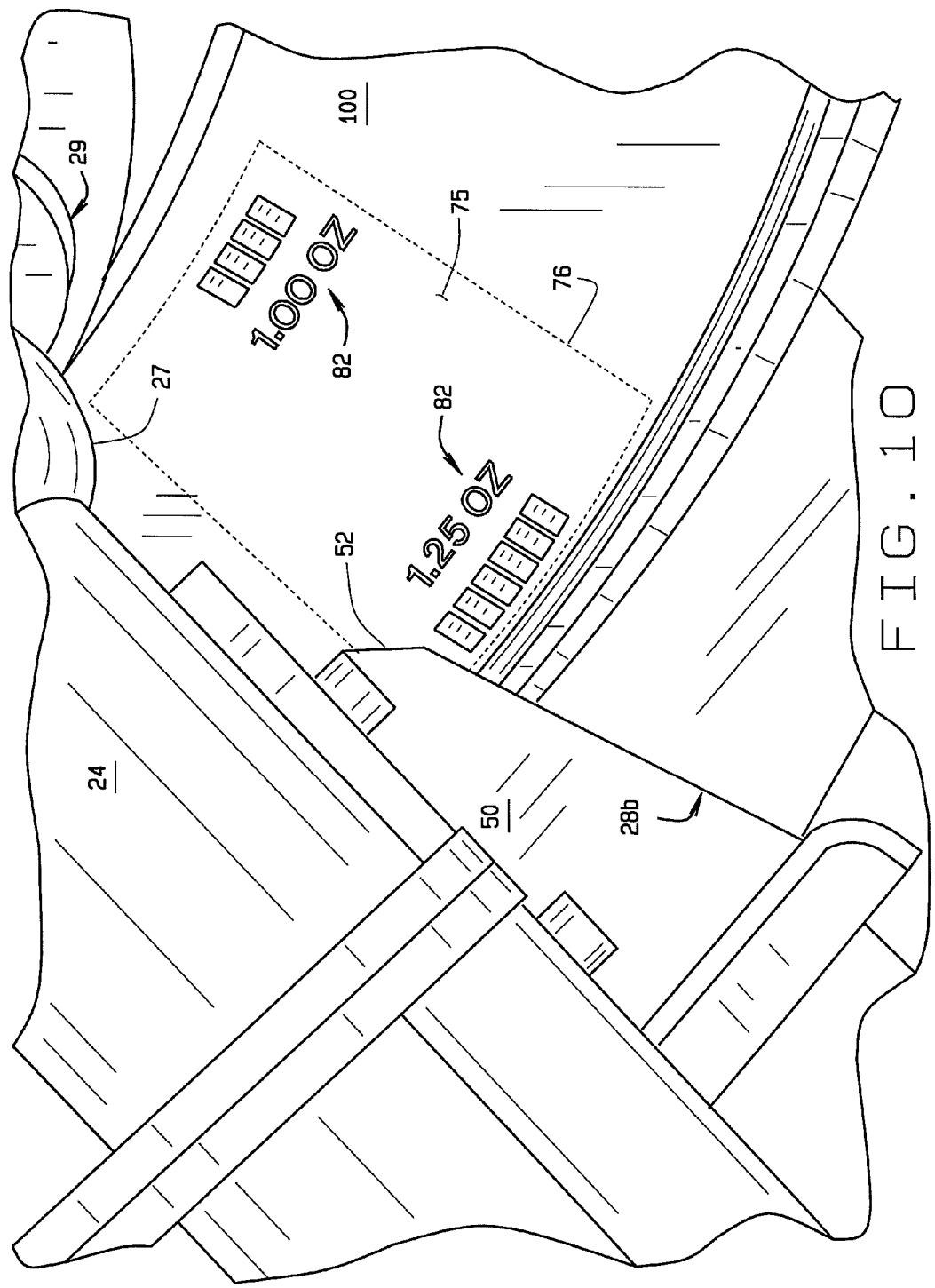
FIG. 10 is a perspective view of a two-dimensional image of a pair of imbalance correction weights and associated alphanumerical data projected onto a surface of a wheel rim and tire assembly at an imbalance correction weight placement location.

For example, to indicate a placement location for an imbalance correction weights on the surface of the vehicle wheel rim and tire assembly 100, the microprocessor 12 may be configured to utilize the laser projection display system 50 to project within the field of projection, a full-scale bit-mapped image 75 of each imbalance correction weight 80 onto the surface of the wheel rim 100 at the selected imbalance correction plane W1 or W2, together with optional textual data 82 identifying the specific size or amount of the imbalance correction weights 80, as shown in FIGS. 9 and 10. Those of ordinary skill in the art will readily recognize that bit-mapped images of multiple imbalance correction weights (FIG. 10) will only be displayed in situations where the angular and axial placement locations for the imbalance correction weights 80 fall within the stationary field of projection 76 of the two-dimensional bit-mapped image 75, and that imbalance correction weight placement locations which lie outside the field of projection on the wheel rim surface will not be shown. It will further be recognized that the for applications where imbalance correction weights 80 have been determined by the balancer system for placement in two separate imbalance correction planes, the microprocessor may be configured to selectively project a display of the weights at each imbalance correction plane separately in sequence, enabling the operator to install a first imbalance correction weight before proceeding to install a second imbalance correction weight, reducing the chances of operator error.

For vehicle wheel balancer systems 10 which do not provide automatic rotational indexing of the vehicle wheel rim and tire assembly 100 to a weight placement rotational position, the textual data 82 may optionally include a directional arrow and/or a rotational angle measurement which directs the operator to manually rotate the wheel rim and tire assembly 100 to the selected weight placement rotational position. The microprocessor 12 is optionally configured to update the textual data 82 presented in the bit-mapped image 75 as the operator rotates the wheel, for example, providing a "live" rotational angle measurement, or providing a "stop" indication to an operator when the wheel rim and tire assembly 100 is in the correct rotational position for placement of an imbalance correction weight, at which point an image of the imbalance correction weight may be provided on the bit-mapped image 75, at the proper placement position.

Alternatively, the microprocessor 12 may be configured to track the current rotational position of the wheel rim and tire assembly 100, and to project an image of a required imbalance correction weight onto the surface of the wheel rim and tire assembly 100, such as shown in FIGS. 9 and 10, at any time during which an identified imbalance correct weight placement axial and rotational position lies within the stationary field of projection 76 of the two-dimensional bit-mapped image 75. As the identified imbalance correct weight placement position is rotated through the field of projection 76, the image of the imbalance correction weight, assumed to occupy less than the full field of projection 76, may optionally be shifted within the field of projection 76 to correspond to the rotational location of the identified imbalance correction weight placement rotational position, thereby allowing an operator a degree of "slack" in placing the wheel rim and tire assembly 100 at a predetermined rotational position prior to installation of an imbalance correction weight. Optionally, the wheel rim and tire assembly 100 is not required to be locked or braked in a fixed rotational position for the placement of the imbalance correction weight.

Utilizing known and measured parameters of the vehicle wheel balancer system 10 and the wheel rim and tire assembly 100, the bit-mapped images 75 projected by the laser projection display system 50 may be optionally manipulated or adjusted prior to projection to compensate for known distortions D in the projected bit-mapped image 75 caused by displacement of, and curvature of, the vehicle wheel rim surfaces onto which the bit-mapped image 75 is projected. The resulting images 75 projected onto the surface of the wheel rim and tire assembly 100 are more easily read, observed, and recognizable by an operator. For example, a bit-mapped image 75 projected onto a planar surface is preferably an orthographic projection. However, due to the curvature of the surface of the wheel rim and tire assembly and an angle at which the bit-mapped image 75 is projected onto the surface, the resulting images appearing on the wheel rim and tire surface are visually perceived by an operator as distorted. Utilizing known and/or measured parameters of the vehicle wheel balancer system 10 and the wheel rim and tire assembly 100, a microprocessor can compensate or manipulate the bit-mapped images 75 from an orthographic projection, such that the resulting images appearing on the wheel rim and tire surface are visually perceived by an operator as substantially orthographic projections, i.e. straight lines visually appear straight, even when traversing a curved surface of the wheel rim and tire assembly, alphanumeric symbols are legible and aligned, etc.

In an alternate embodiment of the present invention, the operator of the vehicle wheel balancer system 10 may manually adjust the placement position of an imbalance correction weight in two dimensions on a surface of the vehicle wheel rim and tire assembly 100 by providing manual inputs to the microprocessor 12 such as through a rotary knob input 18, which result in corresponding changes in the projected bit-mapped image 75 of an imbalance correction weight within the projection area 76. The manual adjustment within two dimensions is limited to adjustments of the imbalance correction weight placement position within the field of projection 76 of the projected bit-mapped image 75 on the vehicle wheel rim surface.

The microprocessor 12 is configured to calculate a new imbalance correction weight magnitude, correspondingly update the rotational position of the wheel rim and tire assembly 100 to which the imbalance correction weight will be applied. If so equipped, the microprocessor 12 will direct the motor control 40 to servo the wheel rim and tire assembly 100 to the new rotational position, corresponding to the operator selected imbalance correction plane. The ability to over-ride the microprocessor-selected imbalance correction plane and weight placement rotational position is of particular importance when the operator, upon visual inspection of the wheel rim and tire assembly 100, identifies a surface defect at the microprocessor-selected weight application point, resulting in the need to adjust at least one weight placement location(s).

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for adjusting a wheel rim and tire assembly imbalance, comprising:
   mounting a wheel rim and tire assembly on a rotatable shaft of a wheel balancer;
   sensing an imbalance of the wheel rim and tire assembly;

determining at least one correction weight placement imbalance plane and at least one associated imbalance correction weight placement rotational position;

adapting a two-dimensional bit-mapped image for displaying, within a stationary field of projection, at least one parameter of the vehicle wheel rim and tire assembly, said adaptation compensating for visual distortions of said two-dimensional bit-mapped image from an orthographic projection due to wheel rim surface curvature and an angle of projection; and projecting within said stationary field of projection, said adapted two-dimensional bit-mapped image onto a surface of said mounted wheel rim and tire assembly.

2. The method of claim 1 wherein said projected image is a two-dimensional bit-mapped image of at least one imbalance correction weight.

3. The method of claim 2 wherein said step of projecting includes projecting said two-dimensional bit-mapped image of said at least one imbalance correction weight at said determined at least one correction weight placement imbalance plane and at said associated imbalance correction weight placement rotational position on said surface of said mounted wheel rim and tire assembly within said stationary field of projection.

4. The method of claim 1 wherein said step of projecting is responsive to said sensed imbalance.

5. The method of claim 1 further including the step of altering said projected image to project a two-dimensional bit-mapped image of at least one imbalance correction weight in said determined at least one correction weight placement imbalance plane responsive to said sensed imbalance.

6. The method of claim 5 further including the step of sensing a current rotational position of the wheel rim and tire assembly; and wherein said step of altering said projected image further includes projecting said two-dimensional bit-mapped image of said at least one imbalance correction weight at said associated imbalance correction weight placement rotational position, responsive to said sensed current rotational position indicative of said associated imbalance correction weight placement rotational position being disposed within said stationary field of projection of said two-dimensional bit-mapped image.

7. The method of claim 1 further including the steps of altering said projected image, within said stationary field of projection, to project a two-dimensional bit-mapped image of a plurality of imbalance correction weights at discrete axial and rotational positions onto a surface of said mounted wheel rim and tire assembly within said stationary field of projection corresponding to the placement locations for said imbalance correction weights.

8. The method of claim 7 wherein said step of altering includes altering said projected image within said stationary field of projection to project a two-dimensional bit-mapped image of a plurality of imbalance correction weights onto a surface of said mounted wheel rim and tire assembly in at least one of said selected correction weight placement imbalance planes.

9. The method of claim 7 further including the step of sensing a current rotational position of the wheel rim and tire assembly; and wherein said step of altering said projected image further includes projecting said two-dimensional bit-mapped image of said plurality of imbalance correction weights at said associated imbalance correction weight placement rotational positions, responsive to said sensed current rotational position indicating at least one of said associated imbalance correction weight placement rotational positions is disposed within said stationary field of projection of said two-dimensional bit-mapped image.

10. The method of claim 1 further including the step of sensing a current rotational position of the wheel rim and tire assembly; and altering said projected image responsive to said sensed current rotational position of the wheel rim and tire assembly.

11. The method of claim 1 further including the steps of:

sensing the rotational position of the wheel rim and tire assembly;

indexing the wheel rim and tire assembly to said at least one associated imbalance correction weight placement rotation position; and altering said projected image to simultaneously project a two-dimensional bit-mapped image of a first imbalance correction weight at said indexed at least one associated imbalance correction weight placement rotation position and in a first correction weight placement imbalance plane, and to project a two-dimensional bit-mapped image of a second imbalance correction weight at a second associated imbalance correction weight placement rotation position and in a second correction weight placement imbalance plane.

12. The method as set forth in claim 1 wherein said projecting step includes projecting a two-dimensional bit-mapped image of alphanumeric data onto a surface of said mounted wheel rim and tire assembly.

13. The method as set forth in claim 1 wherein said projecting step includes projecting a two-dimensional bit-mapped image representative of said sensed imbalance of the wheel rim and tire assembly.

14. The method as set forth in claim 13 wherein said two-dimensional bit-mapped image representative of said sensed imbalance of the wheel rim and tire assembly includes at least one bar graph, said bar graph representative of an imbalance of the vehicle wheel rim and tire assembly.

15. The method as set forth in claim 1 wherein said projecting step includes projecting a two-dimensional bit-mapped image representative of said selected at least one correction weight placement imbalance plane, said image projected onto the vehicle wheel rim and tire assembly at a position corresponding to said at least one correction weight placement imbalance plane.

16. The method as set forth in claim 1 further including the step of altering said two-dimensional bit-mapped image projected on said surface of said mounted wheel rim and tire assembly.

17. The method as set forth in claim 16 further including the step of altering said two-dimensional bit-mapped image responsive to said sensed imbalance of the wheel rim and tire assembly.

18. The method as set forth in claim 16 further including the step of altering said two-dimensional bit-mapped image responsive to operator input.

19. The method of claim 18 for adjusting a wheel rim and tire assembly imbalance wherein said operator input is representative of a positional change in said selected at least one correction weight placement imbalance plane; and wherein said step of altering includes altering a two-dimensional bit-mapped image of an imbalance correction weight within said stationary field of projection.

20. The method of claim 18 for adjusting a wheel rim and tire assembly imbalance wherein said operator input is representative of a change in said at least one associated imbalance correction weight placement rotational position; and wherein said step of altering includes altering a two-dimensional bit-mapped image of an imbalance correction weight within said stationary field of projection.

21. The method of claim 1 further including the step of setting an orientation of said stationary field of projection.

22. A method for adjusting a wheel rim and tire assembly imbalance, comprising:
   mounting a wheel rim and tire assembly on a rotatable shaft of a wheel balancer;
   generating a two-dimensional bit-mapped image of a graphical user interface;
   adapting said two-dimensional bit-mapped image to compensate for visual distortions of said two-dimensional bit-mapped image from an orthographic projection due to wheel rim surface curvature and an angle of projection;
   projecting said adapted two-dimensional bit-mapped image of said graphical user interface onto a surface of said mounted wheel rim and tire assembly, said projected image including a plurality of displayed components;
   sensing an imbalance of the wheel rim and tire assembly;
   determining at least one correction weight placement imbalance plane and at least one associated imbalance correction weight placement rotational position; and
   altering at least one displayed component in said image of said graphical user interface in response to at least one of said sensed imbalance, said determined correction weight placement imbalance plane, and said determined imbalance correction weight placement rotational position.

23. In a wheel balancer having a shaft adapted for receiving a wheel rim and tire assembly, said shaft having a longitudinal axis and being rotatable about said axis so as to rotate the wheel rim and tire assembly removably mounted thereon; a rim measuring apparatus configured to measure at least one parameter of the wheel rim and tire assembly; a sensor assembly for measuring rotation of the shaft about its longitudinal axis; a control circuit connected to the sensor assembly and being responsive to the measured rotation of the shaft; a second sensor assembly for measuring imbalance of the wheel rim and tire assembly; and a microprocessor configured to utilize the wheel rim and tire parameters and measured imbalance to determining the magnitude and placement of a first correction weight in a first imbalance correction plane and the magnitude and placement of a second correction weight in a second imbalance correction plane; the improvement comprising:
   a display projection system for projecting within a stationary field of projection, at least one distortion compensated two-dimensional bit-mapped image onto a surface of a wheel rim and tire assembly mounted on the shaft.

24. The improved wheel balancing apparatus of claim 23 wherein display projection system is responsive to operator input to alter said at least one two-dimensional bit-mapped image projected onto said surface of said wheel rim and tire assembly.

25. The improved wheel balancing apparatus of claim 24 wherein said microprocessor is further configured to adjust at least said imbalance correction plane and at least said associated imbalance correction weight magnitude and placement responsive to said operator input.

26. The improved wheel balancing apparatus of claim 23 wherein said display projection system comprises at least one laser, said laser configured to illuminate a plurality of discrete pixel elements on said surface of the wheel rim and tire assembly, within said stationary field of projection, to project said image.

27. The improved wheel balancing apparatus of claim 23 wherein said display projection system comprises a digital laser projector.

28. The improved wheel balancing apparatus of claim 23 wherein said display projection system comprises a rear projection LCD.

29. The improved wheel balancing apparatus of claim 23 wherein said display projection system comprises a digital light projector.

30. The improved wheel balancing apparatus of claim 23 wherein said display projection system is controlled to project a two-dimensional bit-mapped image including at least one component representative of a determined imbalance correction weight onto said wheel rim surface area at a corresponding imbalance correction plane.

31. The improved wheel balancing apparatus of claim 30 wherein said two-dimensional bit-mapped image further includes at least one component representative of placement parameters for said determined imbalance correction weight.

32. The improved wheel balancing apparatus of claim 23 wherein said display projection system is controlled to project a two-dimensional bit-mapped image of a graphical user interface onto said wheel rim surface area.

33. The improved wheel balancing apparatus of claim 23 wherein said display projection system is configured to project at least one multi-colored two-dimensional bit-mapped image onto a surface of a wheel rim and tire assembly mounted on the shaft.

34. The improved wheel balancing apparatus of claim 23 wherein said display projection system includes means for altering an orientation of said stationary field of projection.

* * * * *